United States Patent [19]

Shimonohara

[11] Patent Number: 5,548,937
[45] Date of Patent: Aug. 27, 1996

[54] METHOD OF JOINTING MEMBERS AND A JOINTING STRUCTURE

[76] Inventor: Takeshige Shimonohara, 8-10, Nishikicho 5-chome, Warabi-shi, Saitama-ken 335, Japan

[21] Appl. No.: 280,703

[22] Filed: Jul. 26, 1994

[30] Foreign Application Priority Data

Aug. 5, 1993 [JP] Japan .................................. 5-212134

[51] Int. Cl.⁶ ................................ B28B 1/00; E04B 1/62
[52] U.S. Cl. .................. 52/586.1; 52/742.13; 52/587.1; 52/259; 52/742.14
[58] Field of Search ............................. 52/586.1, 587.1, 52/742.1, 742.13, 742.14, 259

[56] References Cited

U.S. PATENT DOCUMENTS

| | | | |
|---|---|---|---|
| 4,716,704 | 1/1988 | Murr | 52/586.1 X |
| 4,724,651 | 2/1988 | Fligg | 52/742.13 |
| 5,007,222 | 4/1991 | Raymond | 52/586.1 |
| 5,066,440 | 11/1991 | Kennedy et al. | 52/742.13 X |
| 5,344,700 | 9/1994 | McGath et al. | 52/586.1 X |
| 5,389,167 | 2/1995 | Sperber | 52/742.13 X |

*Primary Examiner*—Wynn E. Wood
*Attorney, Agent, or Firm*—Flynn, Thiel, Boutell & Tanis, P.C.

[57] ABSTRACT

A method of jointing members and a jointing structure capable of simplifying the jointing operation and facilitating jointing of members firmly together without exposing jointed portions on jointing surfaces of the members. A recessed portion is formed in the jointing surface of one member and a bag body made of a flexible material is attached to the jointing surface of the other member wherein the jointing surfaces of both members are brought into contact with each other while the bag body is inserted into the recessed portion and a filler is introduced into and fills the bag body so as to expand the bag body into a shape corresponding to the inner peripheral shape of the recessed portion. Tensile strength is generated in the bag body that has been expanded by the fillers in the jointing direction, whereby both members can be firmly jointed with each other while they are fastened by the filled body bag.

5 Claims, 9 Drawing Sheets

METHOD OF JOINTING MEMBERS AND A JOINTING STRUCTURE

BACKGROUND OF THE INVENTION

1. Field of the Invention

The present invention relates to a method of jointing members and a jointing structure adapted for use in jointing body members such as a concrete block and other various members.

2. Prior Art

In enhancing construction efficiency at a construction site, commercialization of various members formed in a factory has been recently promoted in the construction industry. When the members which have been commercialized in the factory are jointed to each other in the construction site, the members are usually jointed physically with each other such as by using metal pieces, etc. since stress is applied to the jointing portions of the members, and hence they are hardly jointed by adhesive.

Such a prior art jointing means which utilizes the physical jointing method is strong in the jointing strength provided between the members but it has a problem in that the aesthetic appearance is undesirable because the jointed portions of the members are exposed on the surface of the jointed members. Furthermore, since metal pieces are used individually for jointing the members in the manner such that they are engaged with or screwed with each other, this causes the problem in that the jointing operation is troublesome and many operators are required.

SUMMARY OF THE INVENTION

The present invention has been made in view of the problems of the prior art jointing method and jointing structure as mentioned above and the object of the present invention is to provide a method of jointing members and a jointing structure which is simple in jointing operation and the members can be jointed physically with each other while the jointed portions are not exposed on the surface of the jointed members.

To achieve the above objects, a method of jointing members according to a first aspect of the invention comprises the steps of forming a recessed portion in one of the members, integrally attaching a bag body made of a flexible material to a jointing portion of the other member, bringing jointing surfaces of both members into contact with each other while the bag body is inserted into the recessed portion, and injecting a filler into the bag body and filling the bag body so as to expand the bag body along the inner peripheral shape of the recessed portion.

A method of jointing members according to a second aspect of the invention comprises the steps of forming a recessed portion in one of members, integrally attaching a bag body made of a flexible material while the bag body is folded to a jointing portion of the other member, bringing jointing surfaces of both members into contact with each other while the bag body is inserted into the recessed portion, and injecting a filler into the bag body and filling the bag body so as to expand the bag body along the inner peripheral shape of the recessed portion.

A jointing structure formed by the aforementioned first and second aspects of the invention comprise two members which are jointed with each other at jointing surfaces thereof, said two members comprising one member having a recessed portion at its jointing surface and the other member having a bag body made of a flexible material which is inserted into the recessed portion of the one member at its jointing surface wherein two members are jointed with each other in the manner that a filler is forced into and fills the bag body so as to expanded the bag body along the inner peripheral shape of the recessed portion.

According to the aforementioned methods of jointing the members of the present invention, if both members are positioned at their jointing surfaces and the filler is forced into and fills the bag body formed in the other member so as to expand the bag body along the inner peripheral shape of the recessed portion formed in one member, tensile strength is generated in the bag body in the direction of the jointing surface. Both members are jointed with each other while they are fastened with each other by this tensile strength.

According to the thus obtained jointed structure, the recessed portion and the bag body are respectively embedded into both members and both members are jointed to each other while they are fastened with each other by the tensile strength of the bag body.

DETAILED DESCRIPTION

First Embodiment (FIGS. 1 to 4):

A jointing structure according to a first embodiment of the invention will be described with reference to FIGS. 1 to 4.

Figure 1:
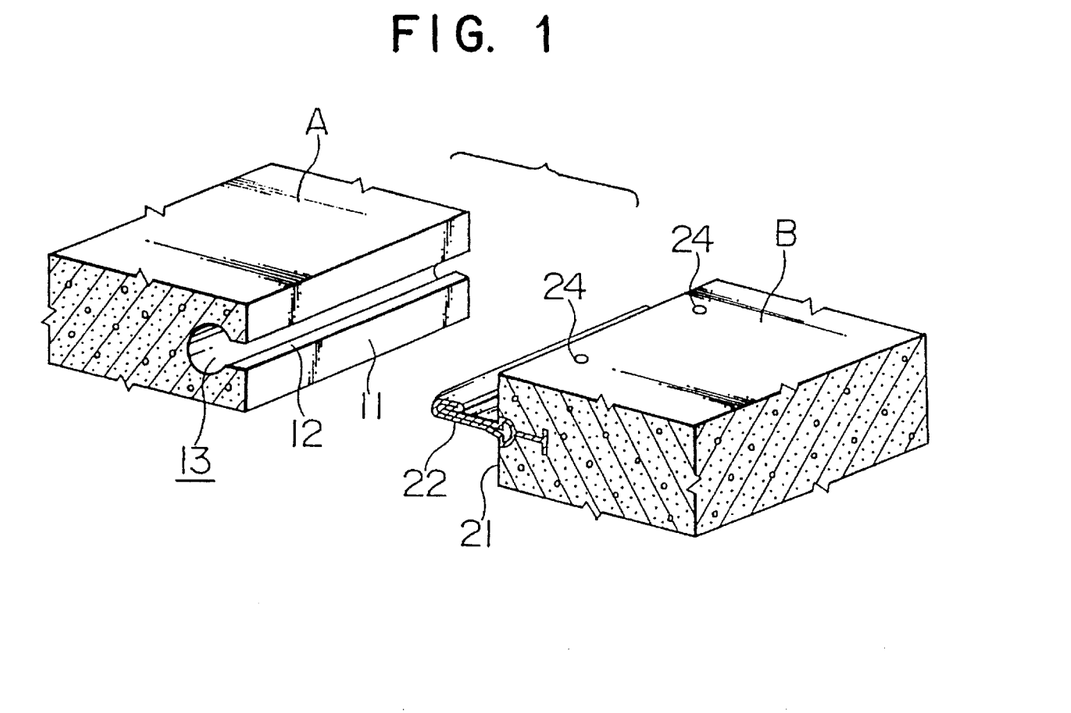
FIG. 1 is an exploded cross-sectional perspective view of a main portion of one member and that of the other member in a state before they are jointed with each other according to a first embodiment of the invention.
Figure 2:
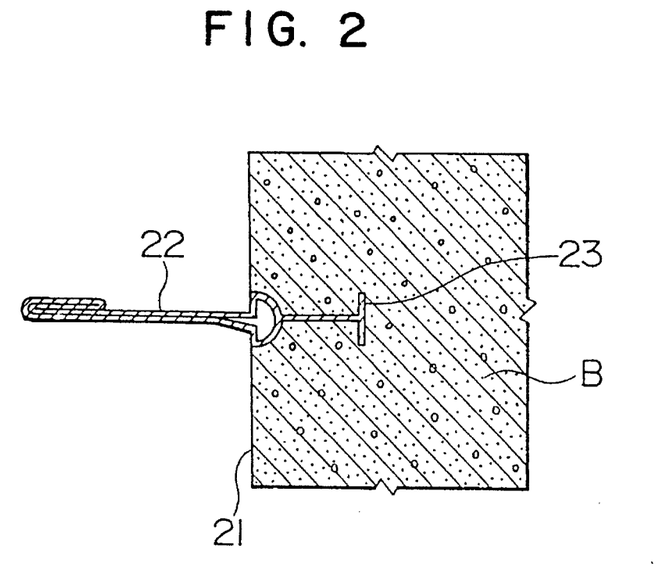
FIG. 2 is a cross-sectional view of the other member in FIG. 1.

One member A and the other member B are respectively made of concrete blocks. A slit-shaped bag receiving opening 12 and a cylindrical recessed portion 13 extending from the opening 12 are respectively formed in a jointing surface 11 of one member A. A band-shaped bag body 22 is attached to a jointing surface 21 of the other member B so as to extend upright from the jointing surface 21. The bag body 22 has an anchor portion 23 embedded in the other member B. The length of the bag body 22 is substantially the same as that of the bag opening 12. The other member B has one or a plurality of tubular introduction passages, not shown. One or each of the introduction passages has an introduction hole 24 at one end thereof and extends to the bag body 22 at the other end thereof. Part of the holes are used for introducing filler in the bag body and the other holes are used as spare holes or for observing the filling state of the filler.

The tip end of the bag body 22 is folded so as to be easily inserted into the bag opening 12 of one member A. The folded portion may be a double-folded, a triple-folded or multiple-folded portion. Metal, synthetic resin, glass fiber, carbon fiber, etc. can be used as a material of the bag body 22. If the material can not support the bag body 22 perpendicularly to the jointing surface 21, namely, if the bag body 22 is made of the material which can not stand the bag body 22 upright on the jointing surface 21, the material must be made hard by an adhesive, etc.

One member A is manufactured by preparing a first mold in which a hollow member having the shape of the bag opening 12 and the recessed portion 13 is embedded, introducing concrete into a second mold for forming the one member A, extracting the first mold or removing the first mold by folding the hollow member after the concrete is hardened in the second mold. The other member B is manufactured by introducing concrete into a mold while embedding the bag body 22 so as to be integrated with the anchored portion 23 and the introduction passage into the mold.

Figure 3:
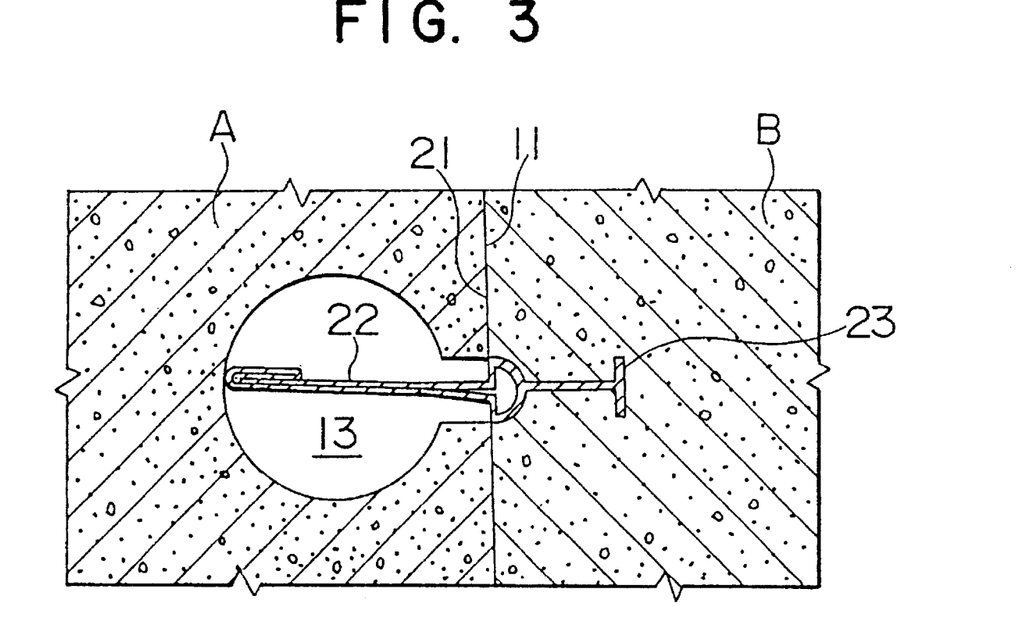
FIG. 3 is a cross-sectional view of both members showing the state where they are positioned relative to each other in FIG. 1.
Figure 4:
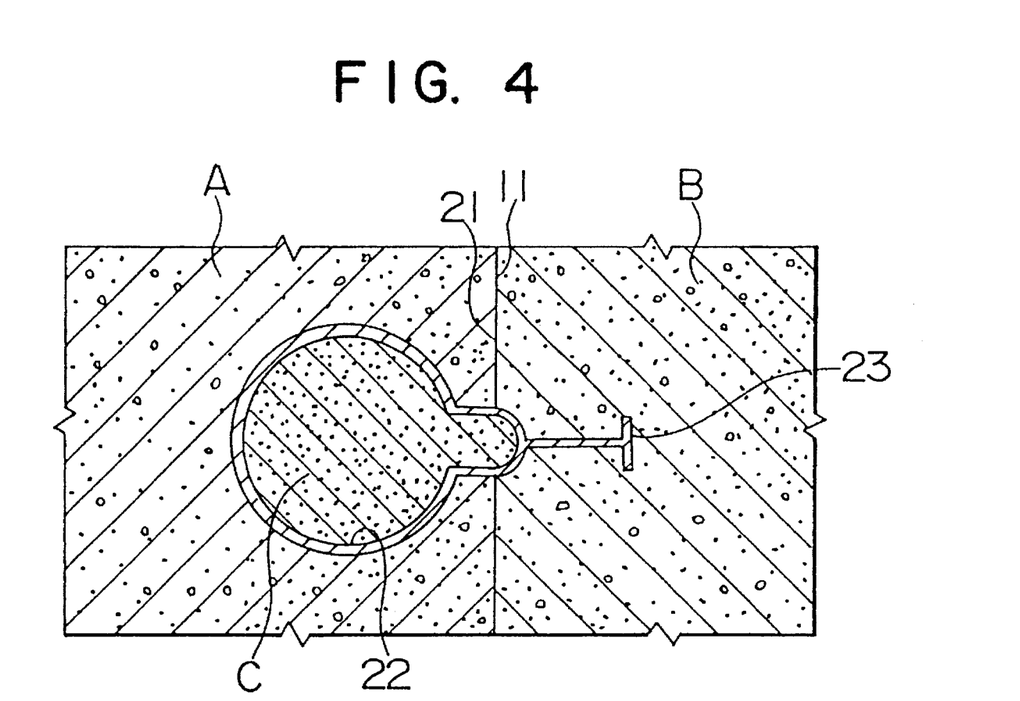
FIG. 4 is a cross-sectional view of both members showing the state where they are jointed with each other in FIG. 1.

To joint one member A to the other member B, the bag body 22 of the other member B is inserted into the recessed portion 13 of the one member A through the bag opening 12, the former being positioned relative to the latter, and then the jointing surfaces 11 and 21 of the former and the latter are brought into contact with each other as shown in FIG. 3. Thereafter, a hardening filler C such as mortar, etc. is forced or introduced by a filling machine into one of the introduction holes 24 of the other member B. The filler C is forced or injected into the bag body 22 through the introduction passage as shown in FIG. 4. The filler C is successively filled in the bag body 22 until the bag body 22 is expanded into a shape corresponding to the inner peripheral shape of the recessed portion 13. If the filler C is hardened after the lapse of a given time, tensile strength is generated in the bag body 22 in the direction of the jointing surface 21. By this tensile strength, one member A and the other member B are jointed with each other in the state where they are fastened with each other. The bag body 22 has such a size that it can closely contact the recessed portion 13 when expanded. If the length of the bag body 22 is shorter than that of the recessed portion 13, one end or both ends of the recessed portion 13 become hollow but the jointing strength of both members A and B is not weakened.

In the first embodiment, when the strong tensile strength is generated between both members A and B, the periphery of the recessed portion 13 of one member A is likely to be damaged. If such a situation is expected to occur, a reinforcing frame may be formed inside the recessed portion 13 to support the inner surface of the recessed portion 13. Such a reinforcing frame may by formed by embedding a frame made of metal or hard resin in one member A when one member A is manufactured.

Figure 5:
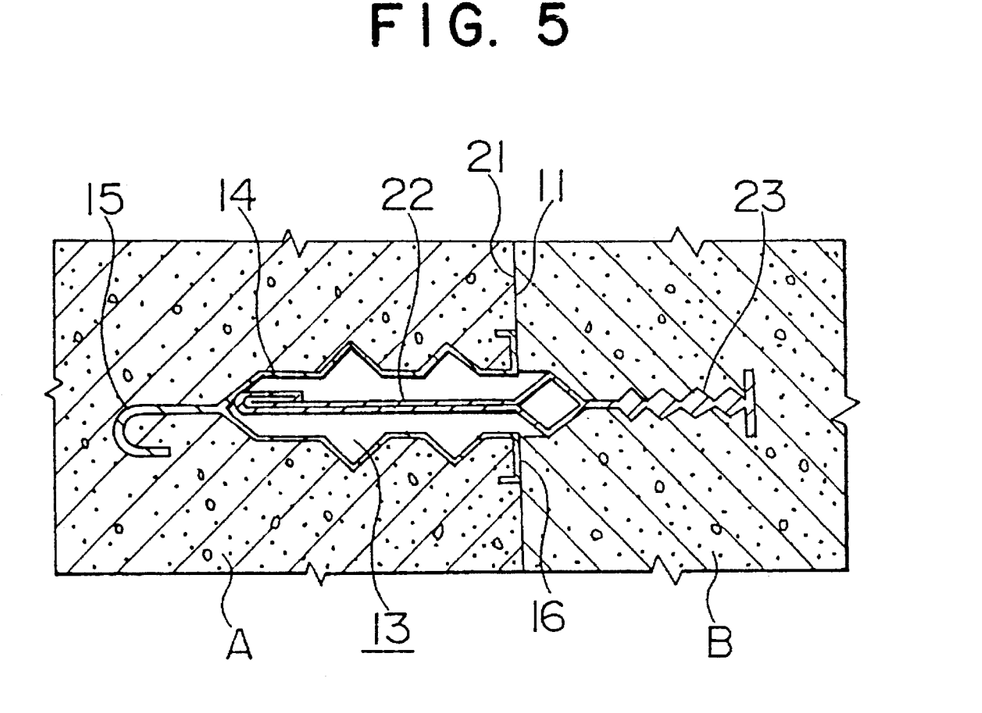
FIG. 5 is a cross-sectional view of both members showing the state where they are positioned relative to each other according to a second embodiment of the invention.
Figure 6:
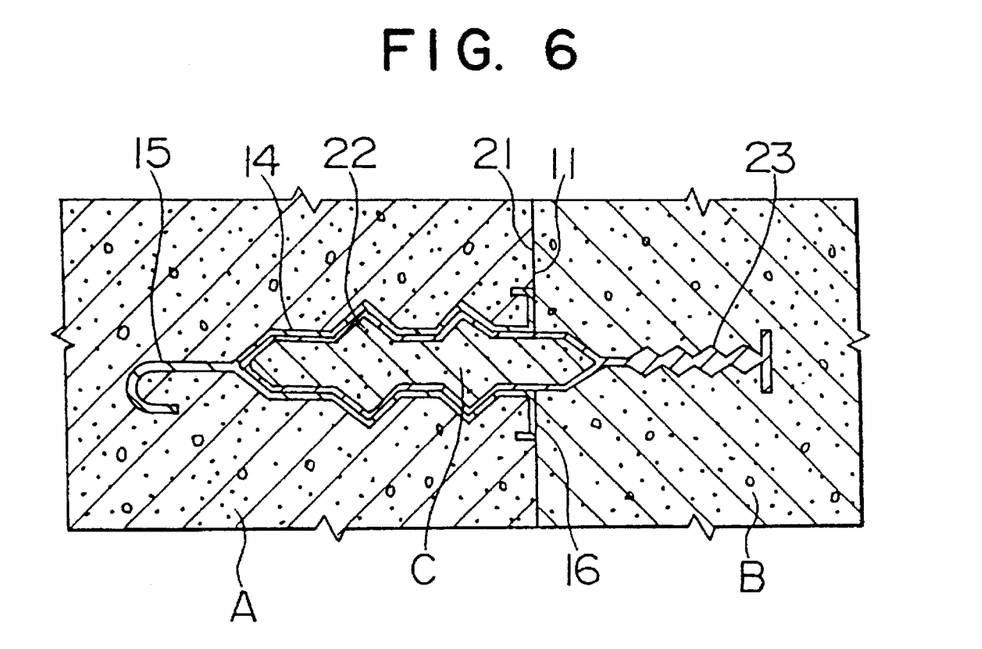
FIG. 6 is a cross-sectional view of both members showing the state where they are jointed with each other in FIG. 5.

Second Embodiment (FIGS. 5 and 6):

A jointing structure according to a second embodiment of the invention will be described with reference to FIGS. 5 and 6.

In the second embodiment, a reinforcing frame 14 having a concave and convex shape at the side surface thereof is embedded in one member A. An anchor portion 15 is provided at the root of the reinforcing frame 14 and a reinforcing flange portion 16 is provided at the bag opening 12. An anchor portion 23 of the bag body 22 of the other member B also has a concave and convex shape at the side surface thereof. If reinforcing rods are embedded in both members A and B, it is preferable to fix the anchor portions 15 and 23 to the reinforcing rods by welding, etc. When both members A and B are positioned relative to each other and then the filler C is injected into the bag body 22, the bag body 22 is deformed into the shape of the reinforcing frame 14 as shown in FIG. 6. When the filler C is hardened, the tensile strength generated in both members A and B is received by a frictional force generated between the reinforcing frame 14 and the bag body 22. As a result, both members A and B are kept firmly jointed with each other unless the filler C is broken. The periphery of the recessed portion 13 of one member A is not broken due to the tensile strength.

The bag body 22 may have a convex and concave shape at the surface thereof corresponding to that of the reinforcing frame 14 or may not have such convex and concave shape. In the latter case, when the filler C is injected into the bag body 22, some wrinkles are formed on the bag body 22, but the jointing strength of both members A and B is not weakened since the filler C is hardened and fixed in the bag 22.

In the first and second embodiments, the recessed portion 13 of one member A extends longitudinally along the jointing surface 11 and the bag body 22 of the other member B is formed in the band shape so as to conform to the recessed portion 13. However, the relation between the recessed portion 13 and the bag body 22 is not limited to such an arrangement. For example, a plurality of recessed portions 13 may be independently arranged side by side and a plurality of bag bodies 22 are rod-shaped and also independently arranged side by side to correspond to each of the recessed portions 13. In any case, the bag body 22 does not become an obstacle when it is folded or wound in an appropriate shape and it can be expanded along the shape of the recessed portion 13 at the time of the introduction of the filler C.

Figure 7:
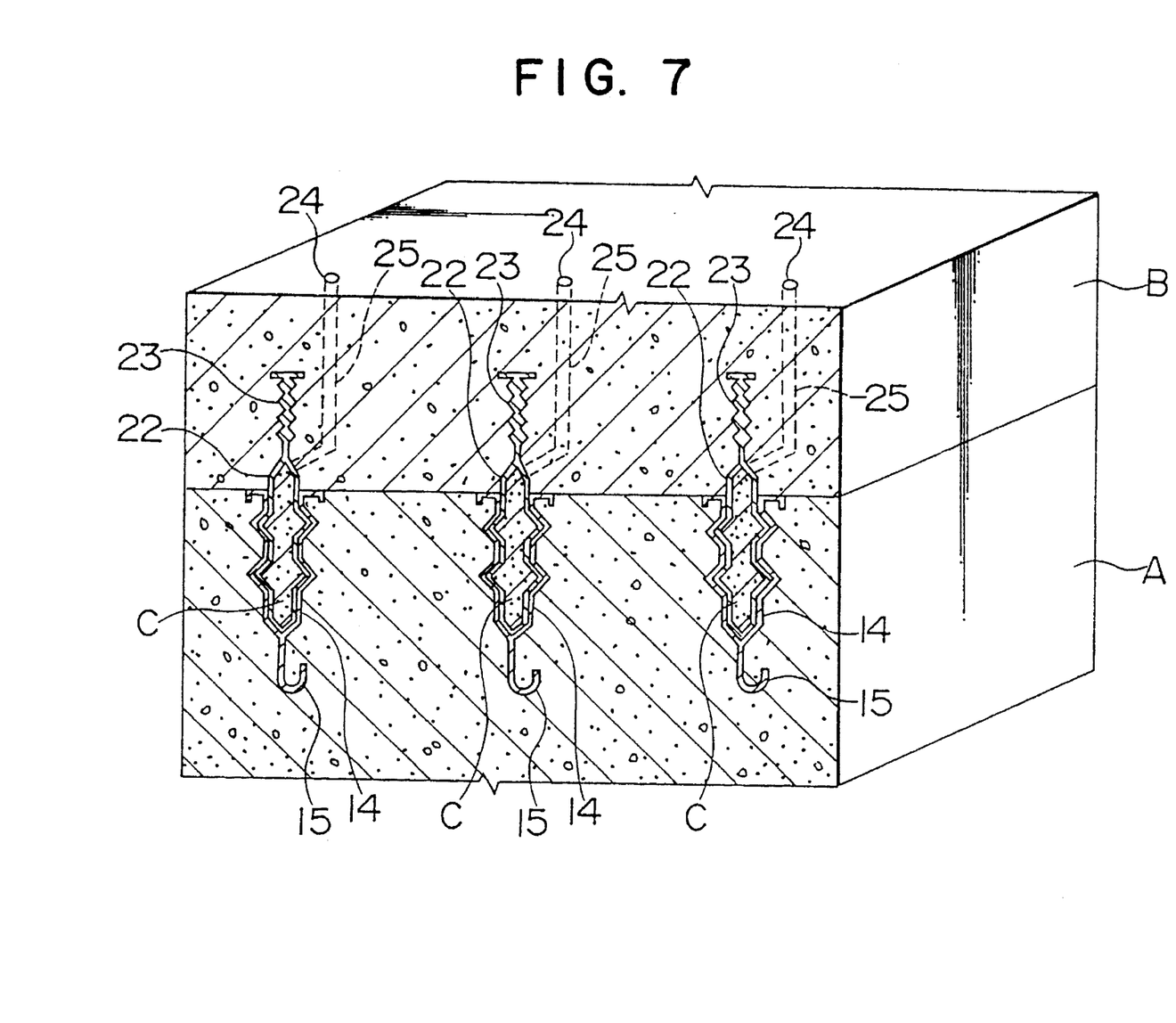
FIG. 7 is a cross-sectional pictorial view explaining a third embodiment of the invention.
Figure 8:
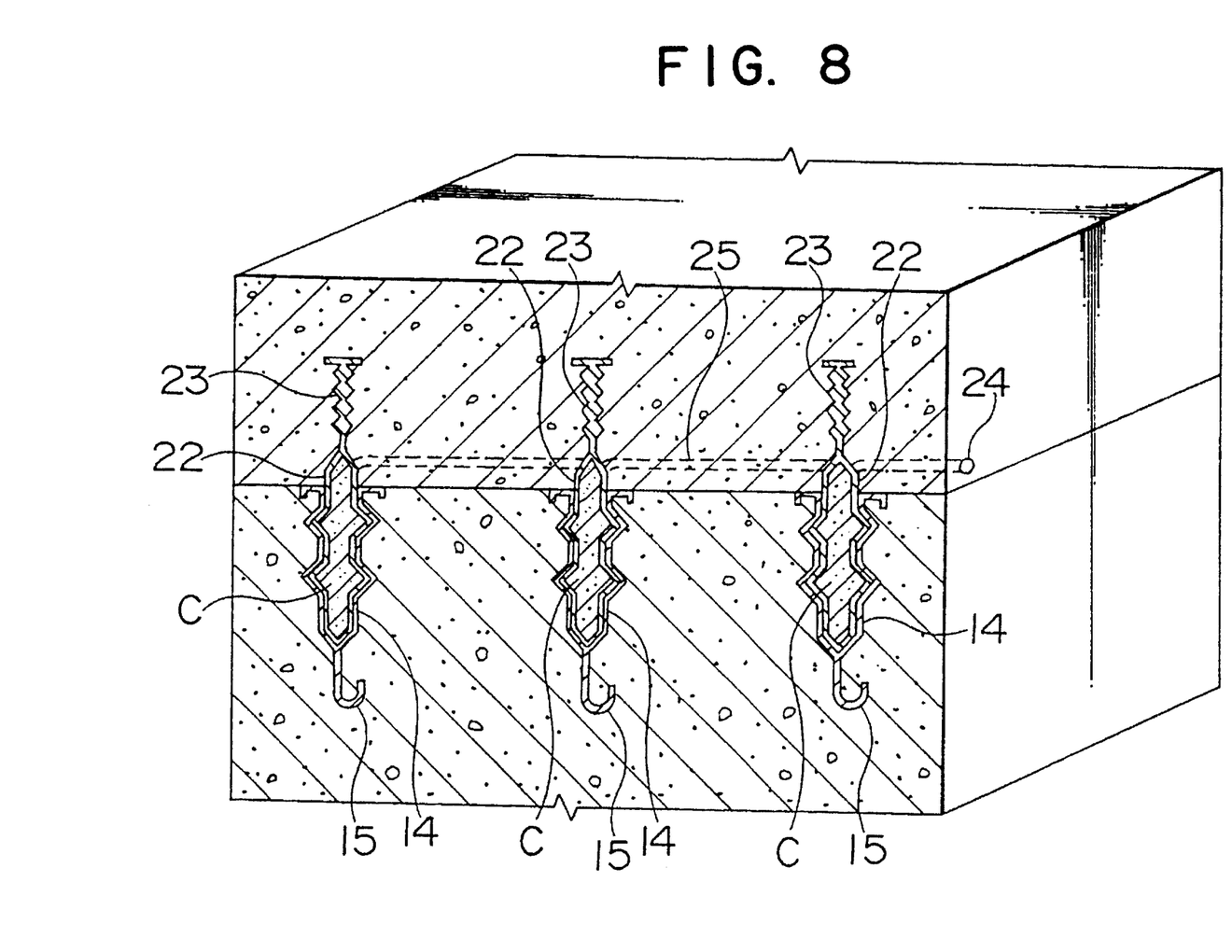
FIG. 8 is a cross-sectional pictorial view explaining a modification of FIG. 7.

Third Embodiment (FIGS. 7 and 8):

A jointing structure according to a third embodiment of the invention will be described with reference to FIGS. 7 and 8.

In the third embodiment, a plurality of reinforcing frames 14 are embedded in one member A independently of one another and a plurality of bag bodies 22 are attached to the other member B independently of one another so as to conform to the reinforcing frames 14. Each of introduction passages 25 is connected to each of the bag bodies 22 and each tip end of the introduction passage 25 is opened to form an introduction hole 24. Accordingly, the filler C is forced to be introduced into each bag body 22 from each introduction hole 24 and it is filled in each bag body 22 by way of each introduction passage 25. In the modification of the third embodiment as illustrated in FIG. 8, there is provided one introduction passage 25 which is connected to each bag body 22. If the filler C is forced to be introduced from one introduction hole 24, the filler C passes the introduction passage 25 and is filled in each bag body 22.

Figure 9:
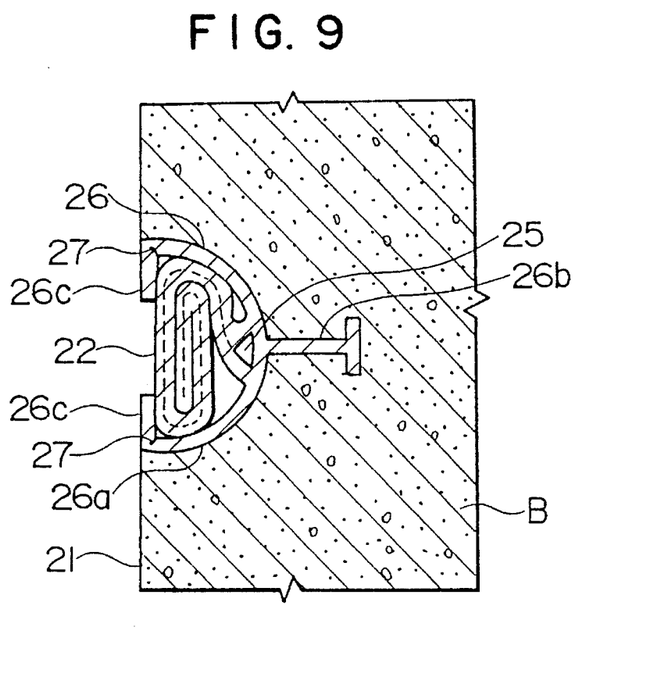
FIG. 9 is a cross-sectional view of a main portion of the other member according to a fourth embodiment of the invention.
Figure 10:
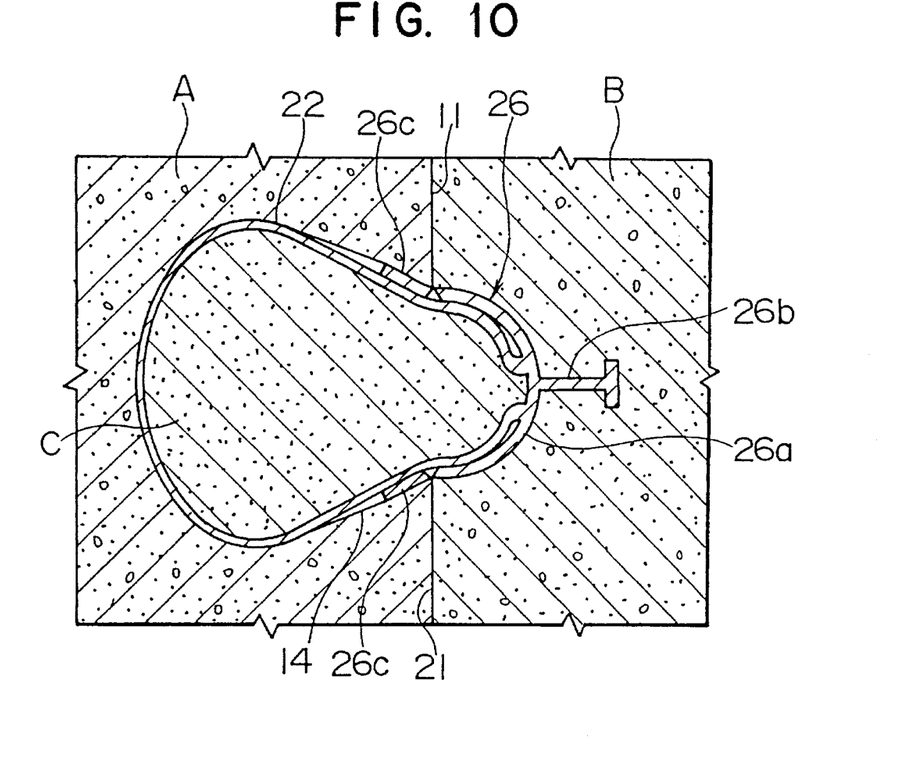
FIG. 10 is a cross-sectional view of main portions of both members where they are jointed with each other according to the fourth embodiment in FIG. 9.

Fourth Embodiment (FIGS. 9 and 10):

A jointing structure according to a fourth embodiment of the invention will be described with reference to FIGS. 9 and 10.

The bag body 22 is previously accommodated in a groove-shaped capsule 26 while it is folded therein. The capsule 26 comprises a capsule body 26a and an anchor portion 26b protruding from the rear portion of the capsule body 26a. A cover portion 26c may be provided on the capsule body 26a at both sides of the opening of the capsule body 26a, if need be. The bag body 22 and the capsule 26 may be made of the same material and integrated with each other. If the material of the body 22 is different from that of the capsule 26, the body 22 and the capsule 22 which are formed separately are attached to each other by an appropriate means. If the material of the capsule 26 is hard, cuts 27 are provided at the boundary of the capsule body 26a and the cover portion 26c from the inside of the cover portion 26c. The other member B is manufactured by introducing concrete into a mold while embedding the capsule 26 incorporating the bag body 22 therein into the mold so that the capsule 26 is attached to the jointing surface 21 of the other member B. If the bag body 22 is formed in the manner that it is accommodated in the capsule 26, there is an advantage in that the bag body 22 does not obstruct the handling of the other member B. If the capsule 26 has the cover portion 26c, the accommodating condition of the bag body 22 is enhanced depending on the material of the bag body 22.

After the positioning of both members A and B, if the filler C is forced to be introduced from the introduction hole 24, the filler C passes the introduction passage 25 and it is filled in the bag body 22. At this time, the cover portion 26c of the capsule 26 is bent and expanded at the cuts 27 by the expansion force of the bag 22 so that the bag body 22 is sprang out from the capsule 26, then it is extended toward the inside of the recessed portion of one member A and is deformed along the shape of the inner surface of the reinforcing frame 14. When the filler C is hardened, both member A and B are jointed with each other.

Figure 11:
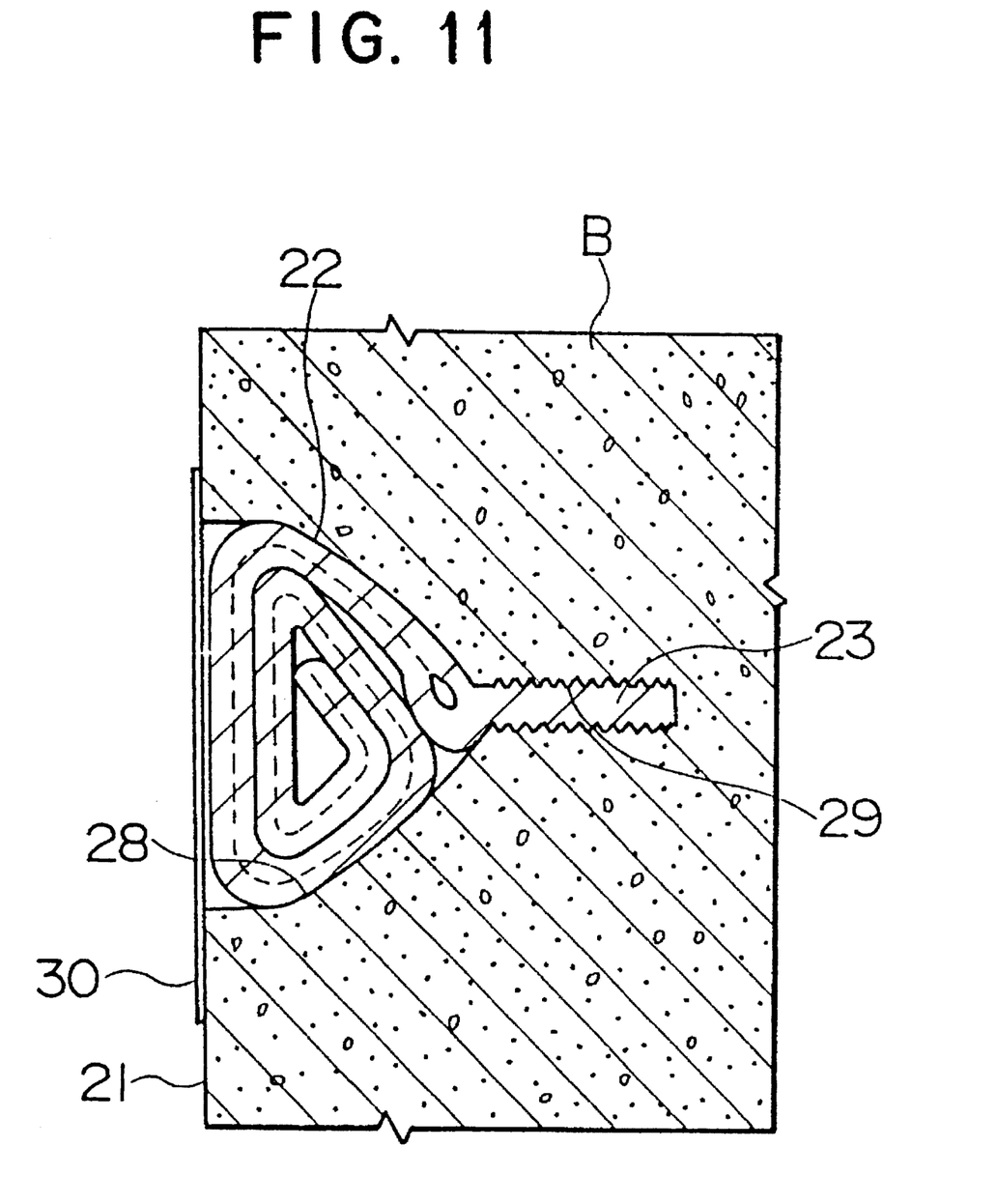
FIG. 11 is a cross-sectional view of a main portion of the other member according to a fifth embodiment of the invention.

Fifth Embodiment (FIG. 11):

A jointing structure according to a fifth embodiment of the invention will be described with reference to FIG. 11.

The other member B has an accommodating groove 28 and an embedding groove 29 formed at the bottom of the accommodating groove 28. The anchor portion 23 of the bag body 22 is embedded in and fixed to the embedding groove 29 and the bag body 22 is wound and accommodated in the accommodating groove 28 and a tape 30 is temporarily adhered to the several spots of the jointing surface 21 of the other member B so as to prevent the bag body 22 from springing out from the accommodating groove 28. If the filler C is forced to be introduced and filled into the bag body 22 after the positioning of both members A and B, the tape 30 is peeled off from the jointing surface 21 by the expansion force of the bag body 22 so that the bag body 22 is sprang out from the accommodating groove 28 and is extended toward the inside of the recessed portion of one member A. In this case, the tape 30 does not affect the jointing of both members A and B since it is thin.

The other member B is manufactured by introducing concrete into a mold while embedding the bag body 22 integrated with the anchored portion 23 into the mold, wherein a protecting member is attached to the bag body 22 so as to surround the bag body 22. The protecting member is pulled out when the concrete is hardened.

According to the first to fifth embodiments, a hardening filler such as mortar, etc. is used as the filler C so as to form a semi-permanent jointing structure. However, gas such as air or liquid such as water can be used as the filler depending on the object of the jointing. If the gas or the liquid is used as the filler, jointed portions can be detached from each other.

The jointing method of the present invention can be used for jointing various members. An example of which is illustrated in FIG. 12 wherein the present invention is applied for jointing body members for forming box-shaped culverts.

Figure 12A:
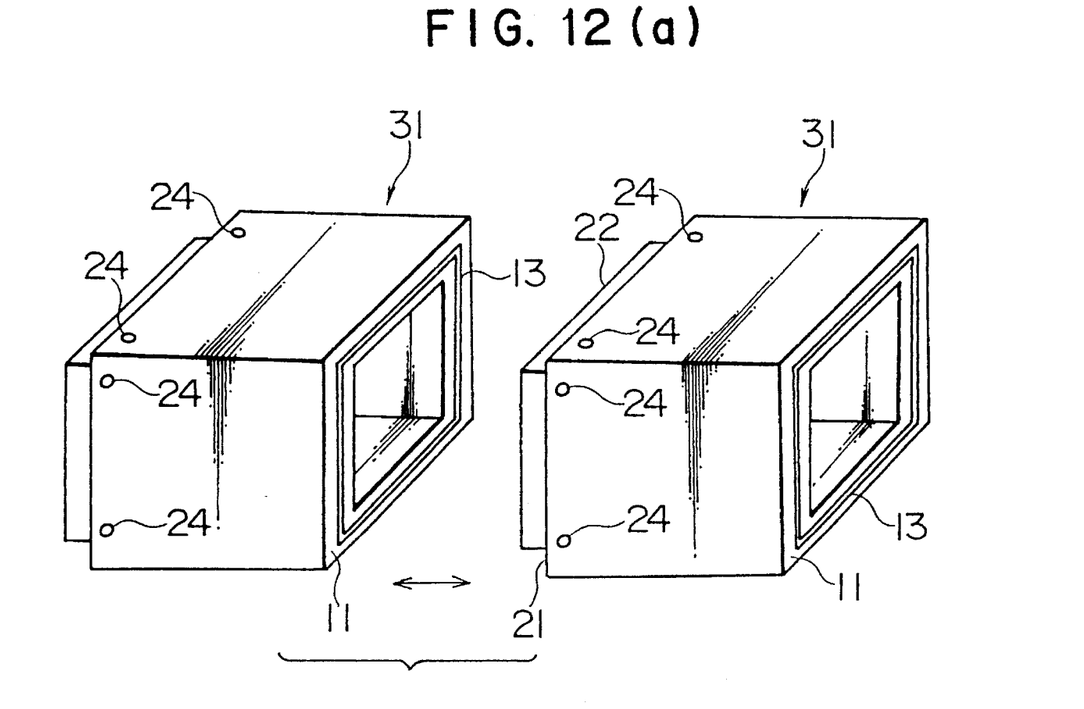
FIGS. 12(a) and 12(b) are exploded pictoral views of body members adopting the jointing structure of the invention, which are viewed in different directions.
Figure 12B:
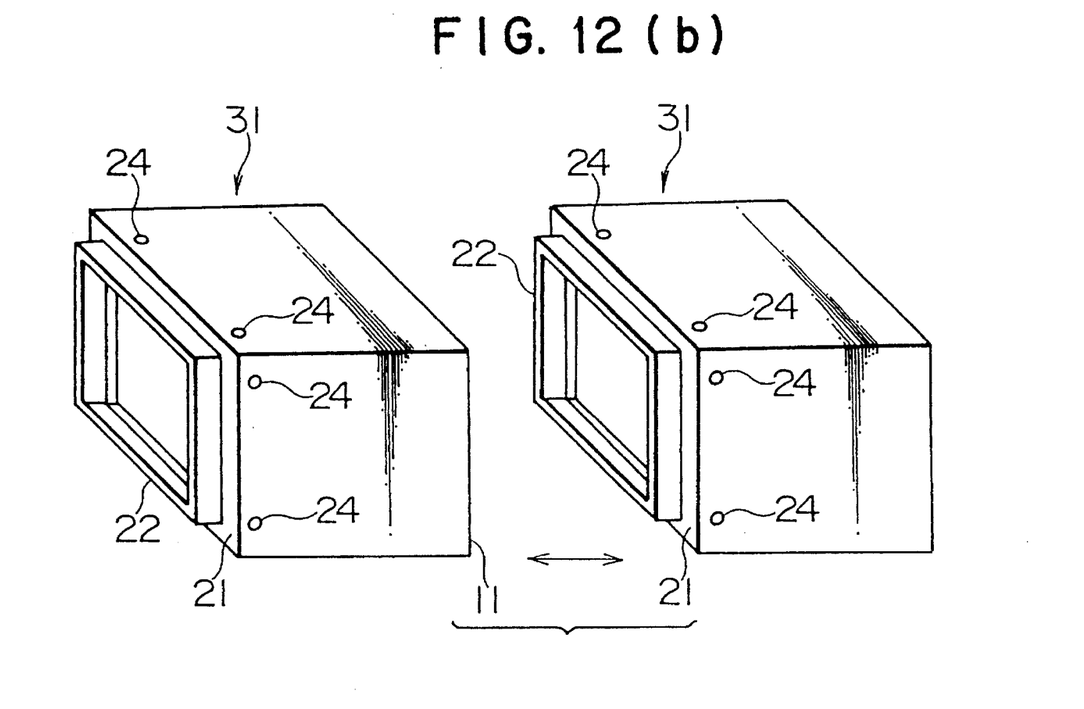

To clarify the structure of the jointing surfaces, there are shown perspective views in FIGS. 12(a) and 12(b) which are viewed in different directions.

Each body member 31 has a recessed portion 13 which is formed circumferentially along the fight side jointing surface 11 and a bag body 22 which is attached circumferentially thereto along the left side jointing surface 21. Two introduction holes 24 are provided at the left end side of upper and lower and left and right surfaces of the body members 31. One of the holes is used for introducing filler in the bag body 22 and the other hole is used for observing the filling state of the filler. Since the bag body 22 is connected to the body member 31, the introduction hole 24 is not always formed on four surfaces of the body member 31. To joint the body members 31, the jointing surfaces 11 and 21 thereof are brought into contact with each other while positioning the recessed portion 13 and the bag body 22 relative to each other and mortar is injected from the introduction hole 24. If the body member 31 is made of a light material, a bolt hole is provided in the body member 31 to prevent the body members 31 from being moved and separated from each other and the body members 31 are jointed with each other while there are connected to each other by a plate and the plate is removed after the mortar is hardened.

Figure 13:
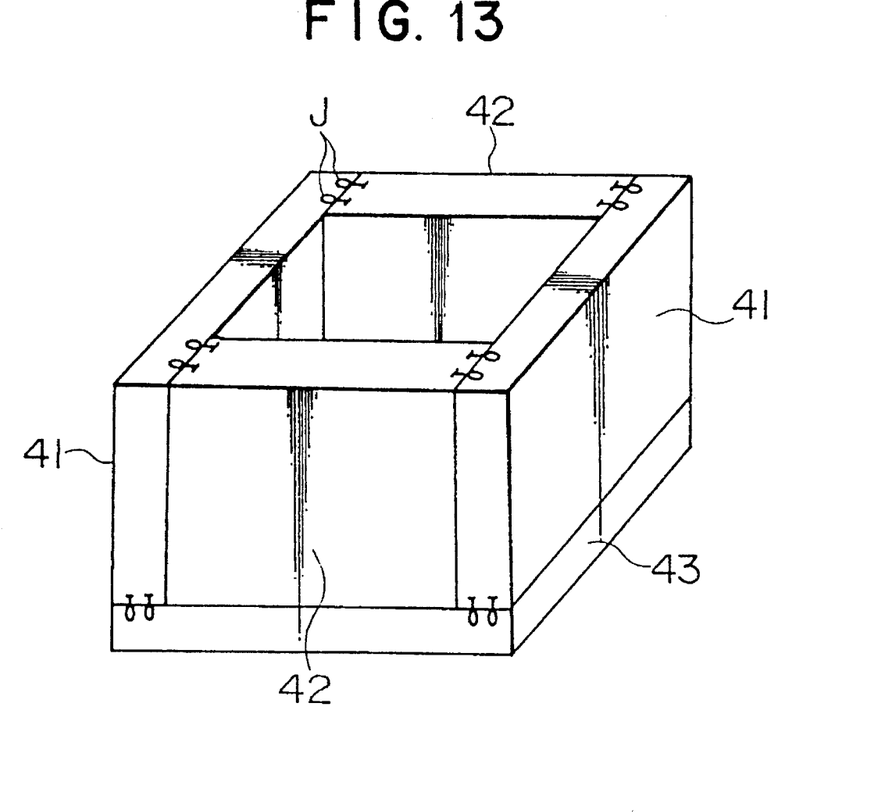
FIG. 13 is another view adopting the present invention.

FIG. 13 shows an example to which the present invention is applied for jointing the body members forming a water tank. Plate-shaped body members 41, 42 and 43 are assembled in a box-shape and the recessed portions and the bag bodies are respectively provided to form jointing portions J. Since this is used for the water tank, the recessed portions and the bag bodies continue along the four side surfaces thereof and the jointing portions J are arranged in two rows, namely, upper and lower portions of the four surfaces at the corners in FIG. 13. Since the jointing portions J are arranged in two rows, water tightness of the water tank is enhanced and the jointing portions J function as the reinforcing members so that the water tank can have high strength.

Figure 14:
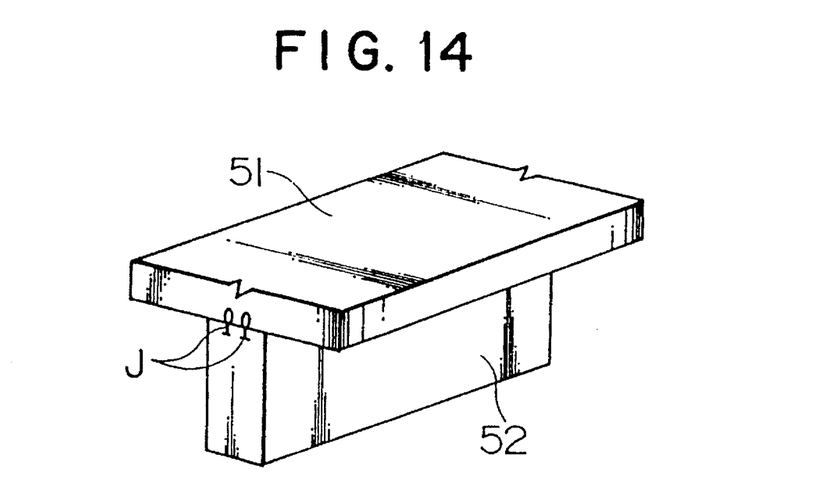
FIG. 14 is still another view adopting the present invention.

FIG. 14 shows an example to which the present invention is applied for jointing the body members. Two long body members 51 and 52 are jointed with each other like a T-shape. Such body members are used for example in a T-shaped beam. If a load to be applied to the beam is large, the body members 51 and 52 are jointed with each other at the continuous jointing portion J. If the load to be applied to the beam is small, the body members 51 and 52 are jointed with each other at the independent jointing portions J.

In the examples as shown in FIGS. 13 and 14, the jointing portions J may be concealed by providing an appropriate cover so as to prevent the jointing portions from being exposed on the end surfaces.

As mentioned above, the method of jointing the members according to the present invention comprises the steps of bringing two members into contact with each other while positioning them relative to each other at their jointing surfaces, then injecting the filler into the bag body which is attached to the other member so that the bag body is expanded in the recessed portion provided in one member, whereby the two members can be jointed firmly with each other with simple jointing operation.

According to the jointing structure of the present invention, since the bag body attached to the jointing surface of the other member is inserted into the recessed portion formed in the jointing surface of one member and the bag body is expanded by the filler along the shape of the recessed portion, both members are jointed with each other in the state where the jointed portions are not exposed to their jointing surfaces and the tensile strength is generated in the bag body expanded by the fillers in the jointing direction, whereby both members can be firmly jointed with each other while they are fastened to each other.

What is claimed is:

1. A method of jointing at least first and second members comprising the steps of:

forming a recessed portion in a jointing surface of said first member, said recessed portion defining an inner peripheral shape;

integrally attaching a bag body made of a flexible material to a jointing surface of said second member;

bringing said respective jointing surfaces of said first and second members into contact with each other while said bag body is inserted into said recessed portion; and injecting a filler into said bag body so as to expand said bag body into engagement with said inner peripheral shape of said recessed portion, whereby said first and second members are jointed with each other.

2. A method of jointing at least first and second members comprising the steps of:

forming a recessed portion in a jointing surface of said first member, said recessed portion defining an inner peripheral shape;

integrally attaching a bag body made of a flexible material to a jointing surface of said second member while said bag body is folded, said bag body defining an interior therein;

bringing said jointing surfaces of said first and second members into contact with each other while said bag body is inserted into said recessed portion; and injecting a filler into said interior of said bag body and filling said bag body so as to expand said bag body within said recessed portion into a shape corresponding to said inner peripheral shape of said recessed portion, whereby said first and second members are jointed with each other.

3. A jointing structure comprising first and second members which have respective jointing surfaces and are jointed with each other with said respective jointing surfaces thereof disposed adjacent to one another, said first member having a recessed portion formed therein which opens outwardly from said jointing surface and defines an inner peripheral shape thereof, said second member having a bag body made of a flexible material attached to said jointing surface thereof, said bag body disposed within said recessed portion when said first and second members are jointed together and having a filler injected into said bag body, said bag body being expanded by said filler into a shape corresponding to said inner peripheral shape of said recessed portion, whereby said first and second members are jointed with each other.

4. The jointing structure of claim 3, wherein said bag body is in a folded condition prior to injection of said filler therein.

5. The jointing structure of claim 3, wherein said recessed portion increases in width in a direction away from said jointing surface.

* * * * *